(12) United States Patent
Naser et al.

(10) Patent No.: US 12,556,698 B2
(45) Date of Patent: Feb. 17, 2026

(54) METHODS AND APPARATUSES FOR ENCODING/DECODING A VIDEO

(71) Applicant: InterDigital CE Patent Holdings, SAS, Paris (FR)

(72) Inventors: Karam Naser, Mouaze (FR); Franck Galpin, Thorigne-Fouillard (FR); Philippe Bordes, Laille (FR); Fabrice Le Leannec, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/694,304

(22) PCT Filed: Sep. 6, 2022

(86) PCT No.: PCT/EP2022/074737
§ 371 (c)(1),
(2) Date: Mar. 21, 2024

(87) PCT Pub. No.: WO2023/046463
PCT Pub. Date: Mar. 30, 2023

(65) Prior Publication Data
US 2024/0406392 A1  Dec. 5, 2024

(30) Foreign Application Priority Data
Sep. 23, 2021  (EP) ................................ 21306314

(51) Int. Cl.
*H04N 7/12* (2006.01)
*H04N 19/103* (2014.01)
*H04N 19/12* (2014.01)
*H04N 19/176* (2014.01)
*H04N 19/182* (2014.01)
*H04N 19/61* (2014.01)
*H04N 19/70* (2014.01)

(52) U.S. Cl.
CPC .......... *H04N 19/12* (2014.11); *H04N 19/103* (2014.11); *H04N 19/176* (2014.11); *H04N 19/182* (2014.11); *H04N 19/61* (2014.11); *H04N 19/70* (2014.11)

(58) Field of Classification Search
CPC .................................................... H04N 19/12
See application file for complete search history.

(56) References Cited

U.S. PATENT DOCUMENTS

| | | |
|---|---|---|
| 2015/0381993 A1 | 12/2015 | Lim |
| 2018/0098081 A1 | 4/2018 | Zhao et al. |
| 2021/0084301 A1 | 3/2021 | Siekmann et al. |

OTHER PUBLICATIONS

Xiu et al., "Decoder-side Intra Mode Derivation for Block-based Video Coding", Institute for Electrical and Electronics Engineers (IEEE), 2016 Picture Coding Symposium (PCS), Nuremberg, Germany, Dec. 4, 2016, 5 pages.

(Continued)

*Primary Examiner* — Young Lee
(74) *Attorney, Agent, or Firm* — Condo Roccia Koptiw LLP

(57) ABSTRACT

A method comprising decoding a video is provided, wherein decoding the video includes determining at least one transform for a block of the video based on at least one part of reconstructed pixels surrounding the block, decoding the block by applying the at least one determined transform. An apparatus for decoding the video is also provided. Corresponding method and apparatus for encoding a video are also provided.

25 Claims, 9 Drawing Sheets

(56) References Cited

OTHER PUBLICATIONS

"Infrastructure of audiovisual services—Coding of moving video—Reference software for ITU-T H.265 high efficiency video coding", International Telecommunication Union, ITU-T Telecommunication Standardization Sector of ITU, Series H: Audiovisual and Multimedia Systems, Recommendation ITU-T H.265.2, Oct. 2014, 12 pages.
"Transmission of Non-Telephone Signals: Information Technology—Generic Coding of Moving Pictures and Associated Audio Information: Systems", International Telecommunication Union, Telecommunication Standardization Sector of ITU, Recommendation ITU-T H.222.0, Jul. 1995, 135 pages.
"Infrastructure of audiovisual services—Coding of moving video, Versatile video coding", International Telecommunication Union (ITU), Series H: Audiovisual and Multimedia Systems, ITU-T Telecommunication Standardization Sector of ITU, Recommendation H.266, Aug. 2020, 513 pages.
"Infrastructure of audiovisual services—Coding of moving video—Information Technology—Generic coding of moving pictures and associated audio information: Video", International Telecommunication Union, Telecommunication Standardization Sector of ITU, Series H: Audiovisual and Multimedia Systems, Recommendation ITU-T H.262, Feb. 2000, 220 pages.
Xiu et al., "Decoder-side intra mode derivation", Joint Video Exploration Team (JVET) of ITU-T SG 16 WP 3 and ISO/IEC JTC 1/SC 29/WG 11, Document: JVET-C0061, 3rd Meeting: Geneva, Switzerland, May 26, 2016, 5 pages.

METHODS AND APPARATUSES FOR ENCODING/DECODING A VIDEO

CROSS REFERENCE TO RELATED APPLICATIONS

This application is a U.S. National Stage Application under 35 U.S.C. § 371 of International Patent Application No. PCT/EP2022/074737, filed Sep. 6, 2022, which is incorporated herein by reference in its entirety.

This application claims priority to European Application No. 21306314.2, filed Sep. 23, 2021, which is incorporated herein by reference in its entirety.

TECHNICAL FIELD

The present embodiments generally relate to a method and an apparatus for video encoding or decoding. Some embodiments relate to methods and apparatuses for video encoding or decoding where transform selection for a block to encode/decode is derived at the decoder from at least one part of a reconstructed block.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a first aspect, a method for encoding a video is provided, wherein encoding the video comprises determining at least one transform for a block of the video based on at least a part of a reconstructed block of the video, encoding the block by applying the at least one determined transform.

An apparatus for encoding a video is provided. The apparatus comprises one or more processors, wherein said one or more processors are configured to encode a video by determining at least one transform for a block of the video based on at least a part of a reconstructed block of the video, encoding the block by applying the at least one determined transform.

According to another aspect, a method for decoding a video is provided, wherein decoding the video comprises determining at least one transform for a block of the video based on at least a part of a reconstructed block of the video, decoding the block by applying the at least one determined transform.

An apparatus for decoding a video is provided. The apparatus comprises one or more processors, wherein said one or more processors are configured to decode a video, wherein decoding the video comprises determining at least one transform for a block of the video based on at least a part of a reconstructed block of the video, decoding the block by applying the at least one determined transform.

One or more embodiments also provide a computer program comprising instructions which when executed by one or more processors cause the one or more processors to perform the encoding method or decoding method according to any of the embodiments described herein. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
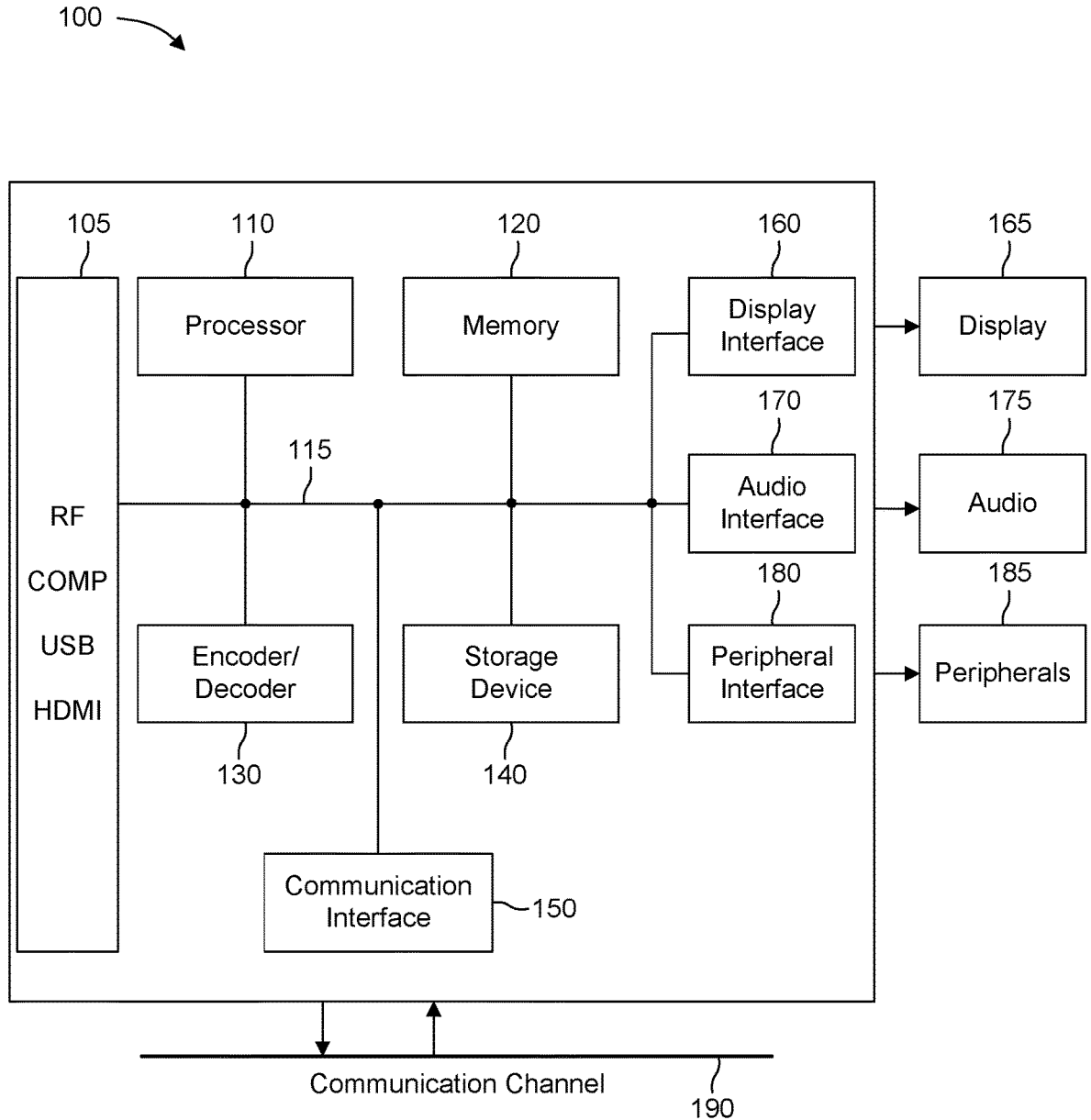
FIG. 1 illustrates a block diagram of a system within which aspects of the present embodiments may be implemented.
Figure 2:
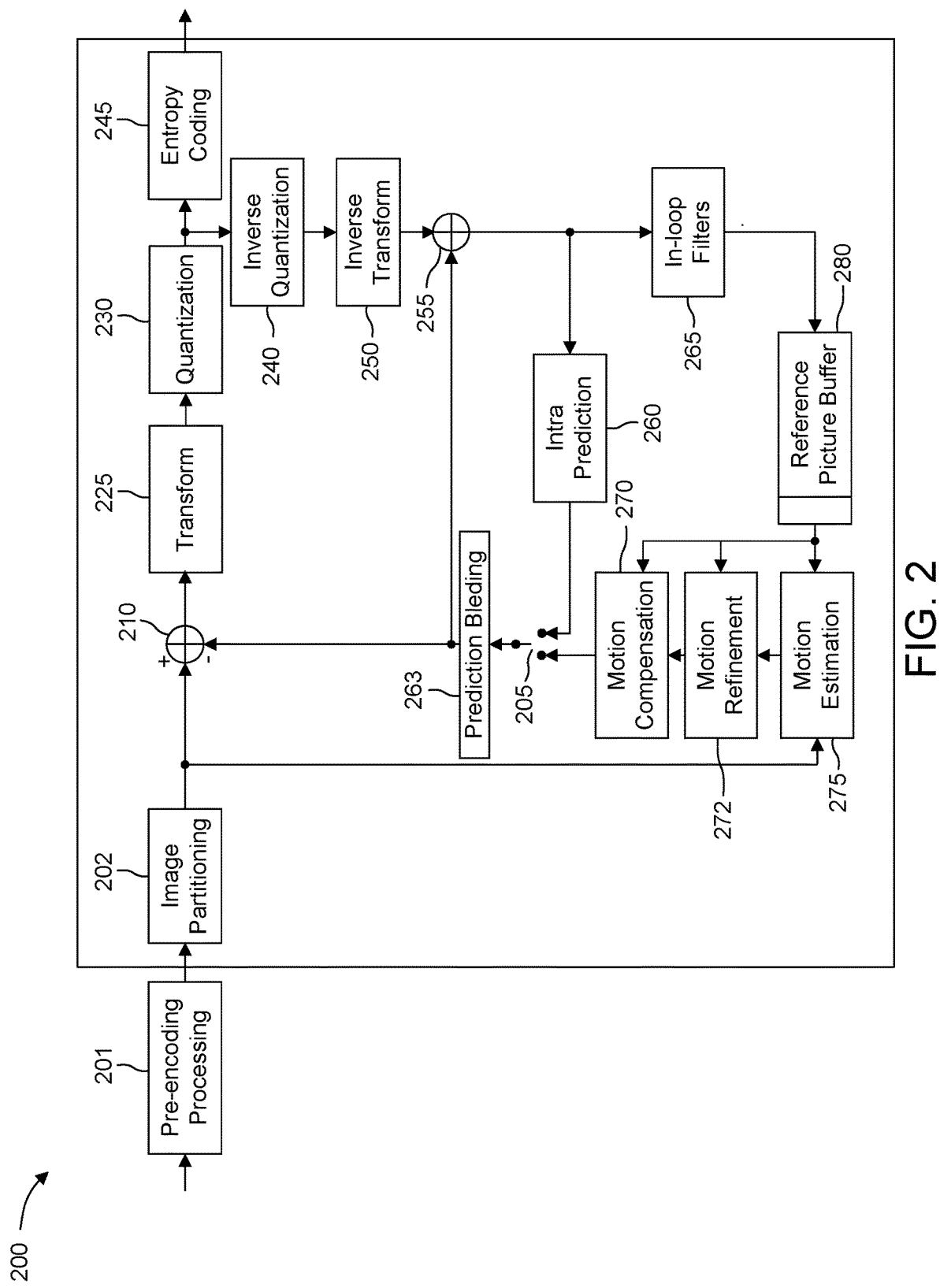
FIG. 2 illustrates a block diagram of an embodiment of a video encoder.
Figure 3:
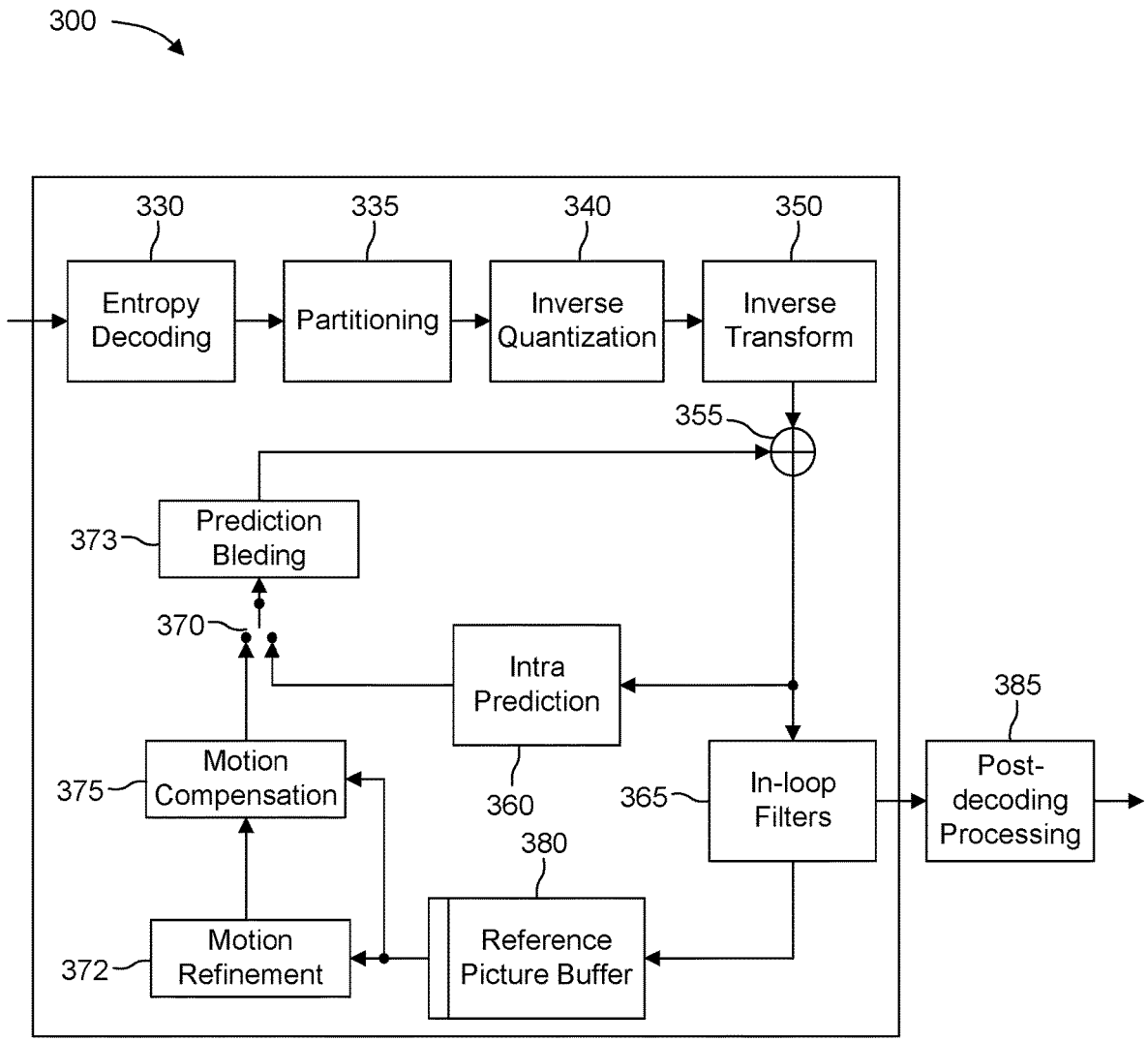
FIG. 3 illustrates a block diagram of an embodiment of a video decoder.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the forward transform module (225), inverse transform module (250) and entropy coding (245) of a video encoder 200 as shown in FIG. 2, and the inverse transform module (350) and entropy decoding (330) of a video decoder 300 as shown in FIG. 3. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In some embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 100 may be provided through various input devices as indicated in block 105. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1, include composite video.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the 12C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11 (IEEE refers to the Institute of Electrical and Electronics Engineers). The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105. As indicated above, various embodiments provide data in a non-streaming manner. Additionally, various embodiments use wireless networks other than Wi-Fi, for example a cellular network or a Bluetooth network.

The system 100 may provide an output signal to various output devices, including a display 165, speakers 175, and other peripheral devices 185. The display 165 of various embodiments includes one or more of, for example, a touchscreen display, an organic light-emitting diode (OLED) display, a curved display, and/or a foldable display. The display 165 can be for a television, a tablet, a laptop, a cell phone (mobile phone), or other device. The display 165 can also be integrated with other components (for example, as in a smart phone), or separate (for example, an external monitor for a laptop). The other peripheral devices 185 include, in various examples of embodiments, one or more of a stand-alone digital video disc (or digital versatile disc) (DVR, for both terms), a disk player, a stereo system, and/or a lighting system. Various embodiments use one or more peripheral devices 185 that provide a function based on the output of the system 100. For example, a disk player performs the function of playing the output of the system 100.

In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

The embodiments can be carried out by computer software implemented by the processor 110 or by hardware, or by a combination of hardware and software. As a non-limiting example, the embodiments can be implemented by one or more integrated circuits. The memory 120 can be of any type appropriate to the technical environment and can be implemented using any appropriate data storage technology, such as optical memory devices, magnetic memory devices, semiconductor-based memory devices, fixed memory, and removable memory, as non-limiting examples. The processor 110 can be of any type appropriate to the technical environment, and can encompass one or more of microprocessors, general purpose computers, special purpose computers, and processors based on a multi-core architecture, as non-limiting examples.

FIG. 2 illustrates an encoder 200. Variations of this encoder 200 are contemplated, but the encoder 200 is described below for purposes of clarity without describing all expected variations.

In some embodiments, FIG. 2 also illustrate an encoder in which improvements are made to the HEVC standard or an encoder employing technologies similar to HEVC, such as a VVC (Versatile Video Coding) encoder under development by JVET (Joint Video Exploration Team).

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of color components), or re-sizing the picture (ex: down-scaling). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods. Prediction residuals are calculated, for example, by subtracting (210) the predicted block from the original image block.

The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 illustrates a block diagram of a video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201), or re-sizing the reconstructed pictures (ex: up-scaling). The post-decoding processing can use metadata derived in the pre-encoding processing and signaled in the bitstream.

Transform coding is a process used in video coding for compacting the residual samples to reduce the number of coefficients to encode. Traditionally, DCT-II transform is used as a default transform for both horizontal and vertical dimensions as in the VVC and HEVC standards for example. However, in VVC, more transform combinations are allowed to better capture the statistical distribution of the residual data. Specifically, DCT-VIII and DST-VII are also used and a transform index (mts_idx) is signaled to the decoder to perform the inverse transform. The transform index identifies a pair of transforms comprising a horizontal transform and a vertical transform in a mapping table that is known both at the encoder and decoder side.

In the existing VVC standards, the transform index (mts_idx)
is coded at the CU level, as shown in the syntax table below:

| | Descriptor |
|---|---|
| coding_unit( x0, y0, cbWidth, cbHeight, cqtDepth, treeType, modeType ) { | |
| ... | |
|   if( treeType != DUAL_TREE_CHROMA && lfnst_idx == 0 && | |
|     transform_skip_flag[ x0 ][ y0 ][ 0 ] == 0 && Max( cbWidth, cbHeight ) <= 32 && | |
|     IntraSubPartitionsSplitType == ISP_NO_SPLIT && cu_sbt_flag == 0 && | |
|     MtsZeroOutSigCoeffFlag == 1 && MtsDcOnly == 0 ) { | |
|     if( ( ( CuPredMode[ chType ][ x0 ][ y0 ] == MODE_INTER && | |
|       sps_explicit_mts_inter_enabled_flag ) \|\| | |
|      ( CuPredMode[ chType ][ x0 ][ y0 ] == MODE_INTRA && | |
|       sps_explicit_mts_intra_enabled_flag ) ) ) | |
|       mts_idx | ae(v) |
|   } | |
| } | |
| } | |

The mapping of the transform index to the transform kernel is done as follows using a mapping table that provides for each value of transform index a pair of a horizontal transform and a vertical transform:

| | mts_idx | | | | |
|---|---|---|---|---|---|
| | 0 | 1 | 2 | 3 | 4 |
| trTypeHor | DCT2 | DST7 | DCT8 | DST7 | DCT8 |
| trTypeVer | DCT2 | DST7 | DST7 | DCT8 | DCT8 | where trTypeHor stands for the horizontal transform applied to the block and trTypeVer stands for the vertical transform.

Although transform coding provides significant coding gain in VVC, the signaling of transform index remains the limiting part for adding more transforms. This is because the more transform used the more signaling required, where no benefit of new transforms can be gained.

The enhanced compression model (ECM) has been proposed as a software for post-VVC video compression development. ECM uses the same signaling process for the transform index mts_idx, where mts_idx ranges from 0 to 4. However, in ECM, further transform kernels are used. Specifically, DST1, DCT5, DST4, DCT4 and identity transforms are also included. The mapping between the transform index mts_idx and the transform kernel depends further on the transform unit size and the intra prediction mode.

According to an aspect, a method for encoding/decoding a video is provided which aims at improving the transform coding part of the video compression by efficiently deriving the transform index at the decoder side. According to an embodiment, the decoder is modified to deduce the transform index by examining the L-shaped reference decoded pixels surrounding a current block to encode or decode. This improves the coding efficiency by avoiding signaling of the transform index and allows for a higher number of transforms.

According to another embodiment, the coding cost of the transform index can be improved. In a similar manner, the transform pairs can be arranged depending on the L-shaped surrounding pixels.

Figure 4:
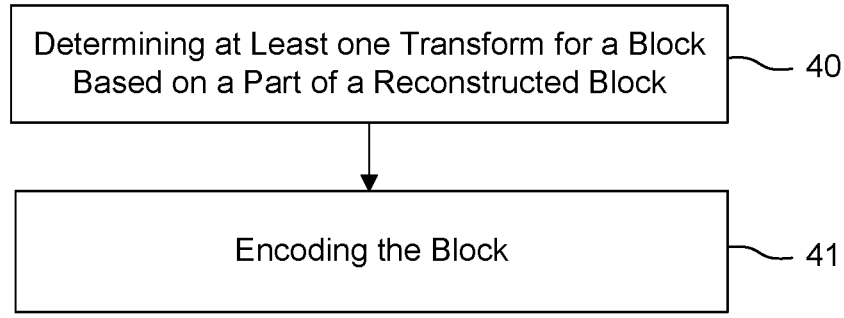
FIG. 4 illustrates an example of a method for encoding a video according to an embodiment.

FIG. 4 illustrates an example of a method for encoding a video according to an embodiment. According to this embodiment, for encoding a block of the video, at 40, at least one transform to be applied to the block is determined based on at least a part of a reconstructed block of the video and at 41, the block is encoded by applying the determined transform, followed by quantization and entropy coding of the quantized coefficients. At 41, syntax elements to relating the modes used for encoding the block are also encoded.

Figure 5:
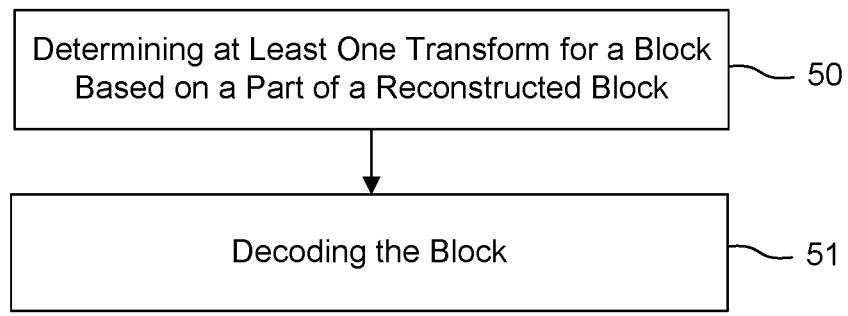
FIG. 5 illustrates an example of a method for decoding a video according to an embodiment.

FIG. 5 illustrates an example of a method for decoding a video according to an embodiment. According to this embodiment, coded data representative of a block of the video are obtained from a bitstream. Coefficients for the block are entropy decoded and inverse quantized. The coded data also comprises syntax elements relating to the modes used for encoding the block.

The block is then reconstructed by determining at 50, at least one transform to be applied to the block, the transform being determined based on at least a part of a block of the video that has been previously reconstructed. Then, at 51, the block is reconstructed by applying the determined transform, in this case the inverse transform.

FIGS. 4 and 5 can be respectively implemented in the encoding/decoding method describe above in relation with FIGS. 2 and 3. In the following the mode for deriving the transform for a current block from parts of reconstructed block is called in the following DTID mode.

Figure 7:
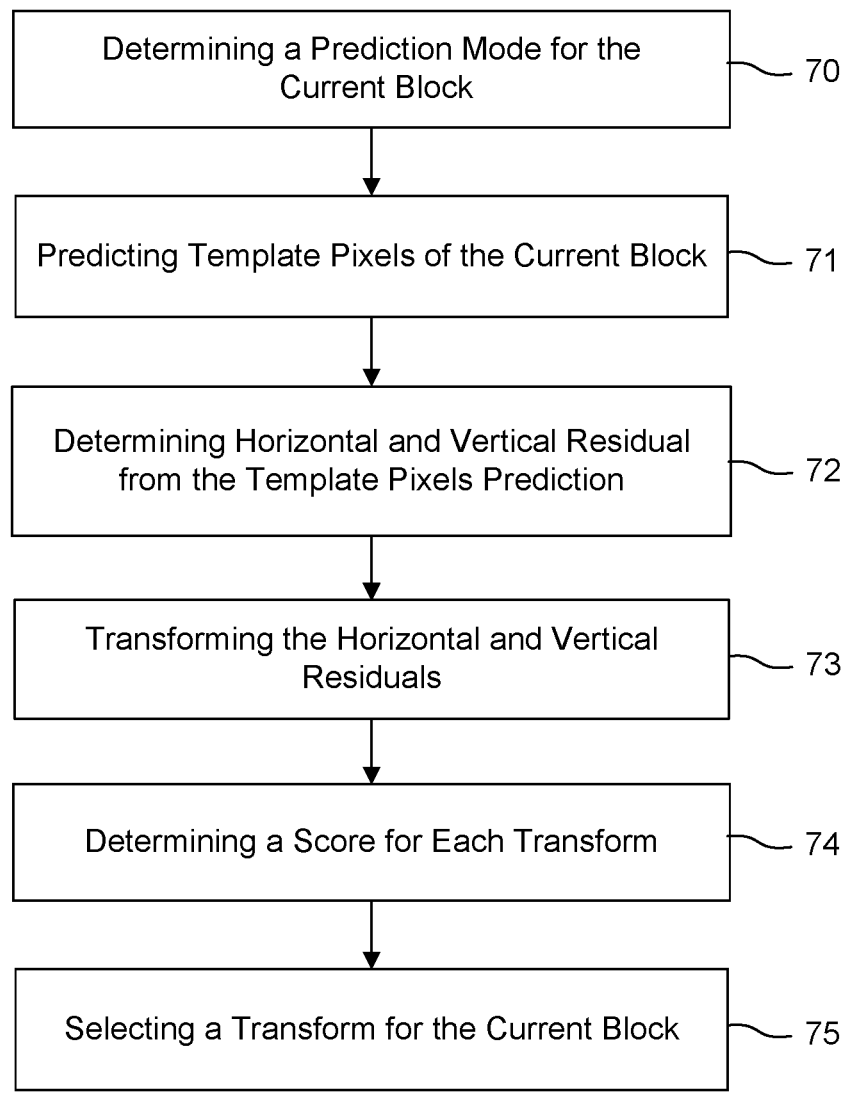
FIG. 7 illustrates an example of a method for determining at least one transform for a current block to encode/decode, according to an embodiment.

FIG. 7 illustrate an example of a method for determining at least one transform for a current block of a video to encode or to decode, according to an embodiment. The method can be implemented in the video encoding or video decoding method described above.

According to an embodiment, when the prediction mode is determined for a block at 70, a secondary prediction (step 71) is performed for the surrounding pixels of the current block. These pixels, named template pixels, are predicted from their corresponding template pixels as shown in FIG. 6, where the pixels surrounding the current block (template pixels are shown with crossed squares: first line on top of the current block and first column on the left of the current block) are predicted from the pixels surrounding them (shown with dashed squares: line on top of the template pixels line and column on the left of the template pixels column) using the same prediction mode as the prediction mode determined at step 70 for the current block, (diagonal intra mode in the example illustrated in FIG. 6).

Figure 6:
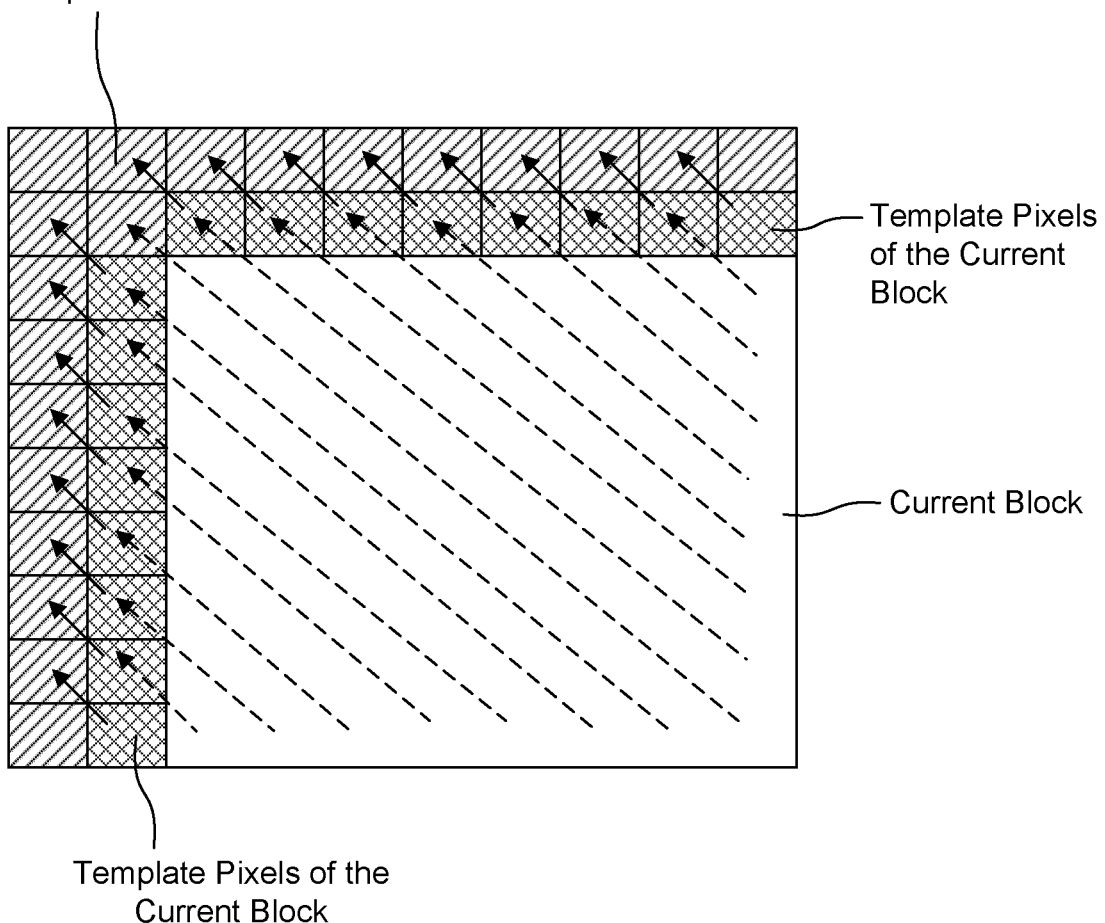
FIG. 6 illustrates an example of a current block with its template pixels and corresponding template pixels of the template pixels of the current block.

In illustrated on FIG. 6, prediction mode can be any intra prediction mode. When the prediction mode is an inter-prediction mode, the inter-prediction is performed for the template pixels of the current block using the reference template pixels, which are the template pixels of the one or more reference blocks from which the current block is inter-predicted, with a same analogy as for intra-prediction.

Depending on the prediction mode determined for the current block, not all pixels of the surrounding pixels may be needed for the prediction. As the method is to be performed in a same way on the encoder and on the decoder, the template pixels that are predicted by the secondary prediction, as well as the surrounding pixels used for predicting the template pixels belongs to the causal part of the current block. In other words, the template pixels and the pixels surrounding the template pixels belong to one or more blocks that have been previously reconstructed (encoded/decoded).

On the encoding side, at step 70, the prediction mode for the current block can be determined using rate-distortion optimization and a syntax element indicating the prediction mode is encoded in the bitstream for the current block. On the decoder side, the syntax element representative of the prediction mode for the current block is decoded from the bitstream.

Once the prediction is performed for the current template pixels, at 72, horizontal residual and vertical residual lines are obtained. The residuals are classically obtained by the difference between the value of the template pixels and their prediction value.

These residuals are assumed to have the same statistical characteristics of the current block residuals; therefore, a same transform selection can be used for the template pixels and the current block.

Figure 8:
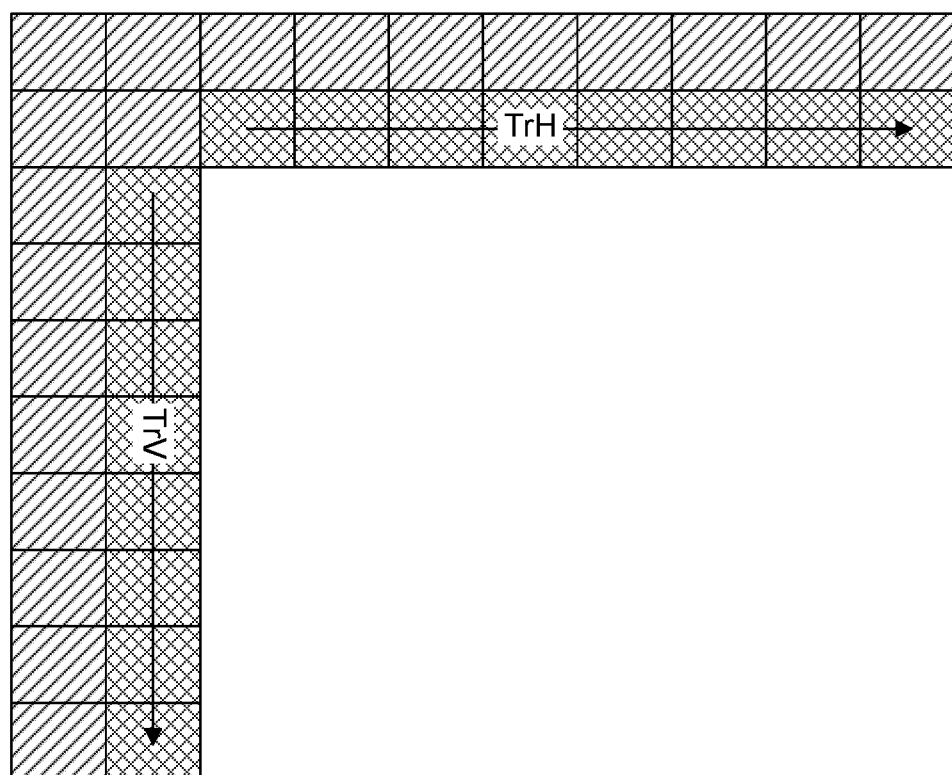
FIG. 8 illustrates an example of a transform process applied to the residual template pixels.

In order to exploit this property, at 73, the obtained residual lines (horizontal, vertical) are tested with different transforms to deduce the best horizontal and vertical transforms. This is shown in FIG. 8 illustrating a transform process applied to the residual template to obtain an optimal transform pair. TrV and TrH are the vertical and horizontal transforms.

At 74, a score is determined for each transform applied to the residual for determining the optimal transform.

According to a variant, the score is determined as an energy sum measure. The measure considers the amount of energy stored in the transform coefficients. According to an embodiment, the measure takes into account the amount of energy stored in only the first transform coefficients. Assuming a transform line of size N, the energy stored in the first M coefficients (M<N) is considered as a criterion for selecting the transform. The energy (E) is computed as sum of the square of the M coefficients (C) of the ith transform as follows:

$$E(i) = \sum_{j=0}^{M-1} C_i(j)^2$$

The transform that maximizes this measure is selected as the optimal transform. According to this measure, the higher the energy is stored in the first coefficients, the higher the coefficients are compacted. Thus, this leads to a reduced bitrate as less information is signaled to the decoder. According to another variant, the score is determined as an absolute sum measure. To simplify the energy measure, the absolute sum of the M coefficients can be used instead of their energy. The absolute sum measure can approximate the energy measure to differentiate between different transform measures. The absolute (A) measure is computed as follows $$A(i) = \sum_{j=0}^{M-1} |C_i(j)|$$

It should be noted that small values of M can be used to reduce the computational complexity, as only the first M coefficients are computed. A simplest method is when M equals to one, where only the first coefficient is computed for each transform candidate.

Once the score has been determined for each transform applied to the template residuals, at 75, the transform that maximizes the score is selected for transforming the residuals of the current block.

According to an embodiment, a horizontal transform and a vertical transform are selected for the current block. In this embodiment, the horizontal transform that maximizes the score among the horizontal transforms applied to the horizontal residuals is selected, and the vertical transform that maximizes the score among the vertical transforms applied to the vertical residuals is selected.

According to the embodiment described with FIG. 7, the transform index indicating the transform pair is not signaled anymore and the transform kernels for horizontal and vertical directions are determined according to the Energy Sum or Absolute Sum Measure.

According to other embodiments, the score can be determined using any other measures, such as a measure of a coding cost of the coefficients, a number of zero coefficients obtained, etc. In some embodiments, the transform that is selected as the optimal transform may be a transform that minimizes the score.

According to an embodiment, a syntax element is signaled to indicate the usage of the mode of derivation of the transform at the decoder side. The syntax element could be signaled at CU level or TU level. At the decoder side, if the syntax element indicates the usage of this mode, the template pixels are first predicted using the prediction mode of the current block. Then, among the N transforms for horizontal or vertical directions, the transforms to apply to the current block are deduced as described above.

In VVC, the number of candidate transforms are 3, as 3 transforms are defined (DCT2, DST7 and DCT8). In ECM, the number becomes 7 as DCT5, DST1, DST4 and DCT4 are added.

---

Below is an example of a syntax for signaling the usage of the DTID mode at CU level. The flag is signaled to indicate the usage of decoder side transform index derivation (cu_dtid_enabled_flag). When this is equal to one, the transform index is not signaled:

| | Descriptor |
|---|---|
| coding_unit( x0, y0, cbWidth, cbHeight, cqtDepth, treeType, modeType ) { | |
| ... | |
|     cu_dtid_enabled_flag[ x0 ][ y0 ] | ae(v) |
| ... | |
|     if( treeType != DUAL_TREE_CHROMA && lfnst_idx == 0 && | |
|         transform_skip_flag[ x0 ][ y0 ][ 0 ] == 0 && Max( cbWidth, cbHeight ) <= | |

Below is an example of a syntax for signaling the usage of the DTID mode at CU level.
The flag is signaled to indicate the usage of decoder side transform index derivation
(cu_dtid_enabled_flag). When this is equal to one, the transform index is not signaled:

| | Descriptor |
|---|---|
| 32 && <br>    IntraSubPartitionsSplitType = = ISP_NO_SPLIT && cu_sbt_flag = = 0 <br>&& <br>    MtsZeroOutSigCoeffFlag = = 1 && MtsDcOnly = = 0 ) { <br>  if( ( ( CuPredMode[ chType ][ x0 ][ y0 ] = = MODE_INTER && <br>    sps_explicit_mts_inter_enabled_flag ) \|\| <br>    ( CuPredMode[ chType ][ x0 ][ y0 ] = = MODE_INTRA && <br>    sps_explicit_mts_intra_enabled_flag ) ) && cu_dtid_enabled_flag[x0][y0] <br>== 0) <br>    mts_idx <br>  } <br> } <br>} | <br><br><br><br><br><br><br><br><br><br>ae(v) |

Figure 9:
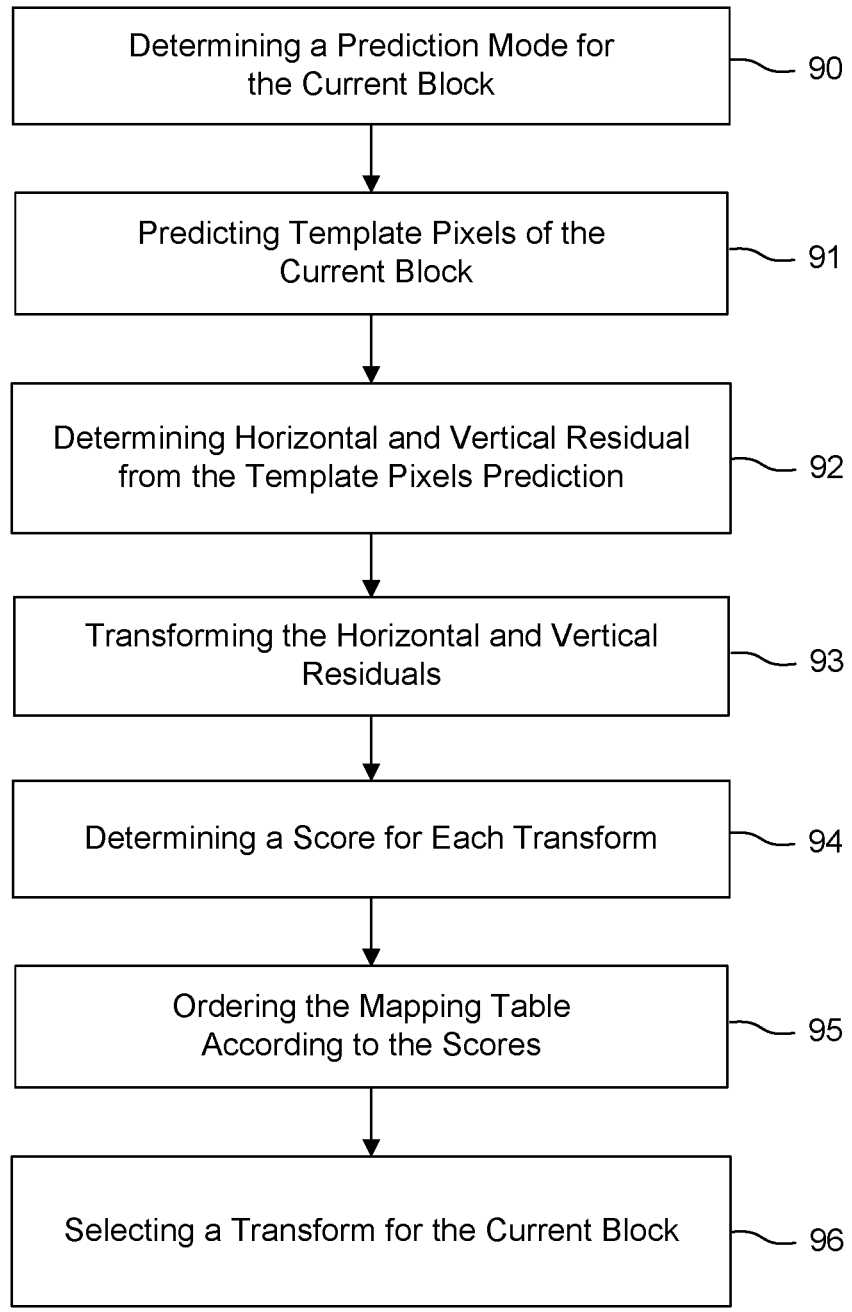
FIG. 9 illustrates an example of a method for determining at least one transform for a current block to encode/decode, according to another embodiment.

FIG. 9 illustrates an example of a method for determining at least one transform for a current block of a video to encode or to decode, according to another embodiment. The method can be implemented in the video encoding or video decoding method described above.

According to an embodiment, when the prediction mode is determined for a block at 90, a secondary prediction (step 91) is performed for the surrounding (template) pixels of the current block, is discussed with FIG. 7. The template pixels are predicted from their corresponding template pixels using the same prediction mode as the prediction mode determined at step 90 for the current block. As for the embodiment of FIG. 7, the prediction mode can be an intra or inter prediction mode.

On the encoding side, at step 90, the prediction mode for the current block can be determined using rate-distortion optimization and a syntax element indicating the prediction mode is encoded in the bitstream for the current block. On the decoder side, the syntax element representative of the prediction mode for the current block is decoded from the bitstream.

Once the prediction is performed for the current template pixels, at 92, horizontal residual and vertical residual lines are obtained. The residuals are classically obtained by the difference between the value of the template pixels and their prediction value.

At 93, the obtained residual lines (horizontal, vertical) are transformed using the different transforms and at 94, a score is determined for each transform applied to the residual. As for the embodiment discussed with FIG. 7, the score can be score based on the obtained coefficients.

In contrast to the embodiment discussed with FIG. 7, in the embodiment of FIG. 9 the transform index (mts_idx) is still signaled but the mapping table is modified according to the score of each transform pair (horizontal and vertical) determined at 94. Specifically, the following is performed:

For each transform candidate in horizontal and vertical dimension, the score is determined according to an energy or absolute measure for the template samples for instance (step 94), At 95, the transform pairs are sorted according to their score. The sorted horizontal transforms are named Tr1H to TrNH and the vertical transform are named Tr1V to TrNV, where N is the number of allowed transform pairs.

The mapping table is modified with the new transform pairs as shown in the example table below:

| | mts_idx | | | | |
|---|---|---|---|---|---|
| | 0 | 1 | 2 | 3 | 4 |
| trTypeHor | Tr1H | Tr2H | Tr3H | Tr4H | Tr5H |
| trTypeVer | Tr1V | Tr2V | Tr3V | Tr4V | Tr5V |

That is, the mapping of the transform index mts_idx is changed at the decoder and encoder side according to the score of each transform pair.

According to a variant, the sorting of the transforms can be performed independently in the horizontal direction and the vertical direction, taking into account the score of the transforms in the horizontal direction independently from the score of the transforms in the vertical direction. Thus, in this variant, the transforms may not be paired in a same manner depending on the independent sorting. According to another variant, the pairs of transforms are sorted jointly, for instance by taking into a combined score for each pair of transforms. The combined score may correspond to an average, a minimum, or a maximum of the scores of the transforms of the pairs. According to a variant, to simplify the process, the sorting can be performed only on the non-DCT2 transforms. That is, the mapping index still contains DCT2 transform in the first entry, while the remaining entries are sorted according to their scores:

| | mts_idx | | | | |
|---|---|---|---|---|---|
| | 0 | 1 | 2 | 3 | 4 |
| trTypeHor | DCT2 | Tr1H | Tr2H | Tr3H | Tr4H |
| trTypeVer | DCT2 | Tr1V | Tr2V | Tr3V | Tr4V |

Back to FIG. 9, once the mapping table is sorted according to the scores of the transforms, at 96, the pair of transforms for the current block is selected from the sorted table. On the encoder side, the pair of transforms is selected for instance using rate-distortion optimization evaluating each pair of transforms and selecting the one that provides the best rate-distortion cost, wherein the rate takes into account the coding cost of transmitting the transform index of the sorted mapping table that corresponds to the pair of transforms under evaluation. When encoding the current block, the encoding comprises encoding the transform index corresponding to the selected pair of transforms.

On the decoder side, the pair of transforms is selected from the sorted mapping table using the transform index that has been decoded from the bitstream.

Template based intra mode derivation (TIMD) is a tool adopted to the ECM software. In the TIMD mode, the template samples of the current block are used to derive the prediction modes that are used to populate the list of most probable modes (MPM). When the current block is encoded using an intra prediction mode, the list of MPM is used for encoding the intra prediction mode.

When TIMD and DTID are used independently from each other, the syntax at CU level can be as follows:

```
coding_unit( x0, y0, cbWidth, cbHeight,
cqtDepth, treeType, modeType ) {
  ...
    Cu_timd_flag
    Cu_dtid_flag
}
``` wherein Cu_timd_flag indicates whether TIMD is enabled for the current block, and Cu_dtid_flag indicates whether DTID is enabled for the current block.

According to an embodiment, TIMD can be used in conjunction with the DTID mode according to any one of the embodiments described herein. Both TIMD and DTID uses the template pixels of the current block. Therefore, both can be combined to reduce the encoder time and signaling. According to a variant, the decoder side transform index derivation (DTID) is only allowed when TIMD is used for the current block. The corresponding syntax for this variant can be as follows:

|  | Descriptor |
|---|---|
| coding_unit( x0, y0, cbWidth, cbHeight, cqtDepth, treeType, modeType ) { <br> ... <br>   if (cu_timd_flag) <br>     cu_dtid_enabled_flag[ x0 ][ y0 ] <br> ... |  <br>  <br>  <br> ae(v) | where cu_timd_flag is the CU level flag for enabling TIMD. That is, when TIMD is not enabled for the current block, the decoder side transform index derivation (DTID) is disabled.

According to another embodiment, the decoder side transform index derivation (DTID) is always used when TIMD is used for the current block. In this variant, therefore, no additional signaling is required.

It is to be understood that the encoding, respectively decoding, methods described above in any one of the embodiments can be implemented in the encoder 200, respectively decoder 300 described in relation with FIGS. 2 and 3 for encoding, respectively decoding a video in/from a bitstream.

Figure 10:
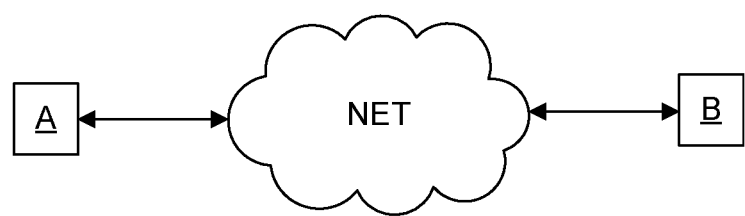
FIG. 10 shows two remote devices communicating over a communication network in accordance with an example of the present principles.

In an embodiment, illustrated in FIG. 10, in a transmission context between two remote devices A and B over a communication network NET, the device A comprises a processor in relation with memory RAM and ROM which are configured to implement a method for encoding a video as described with FIGS. 1-9 and the device B comprises a processor in relation with memory RAM and ROM which are configured to implement a method for decoding a video as described in relation with FIGS. 1-9.

In accordance with an example, the network is a broadcast network, adapted to broadcast/transmit encoded data representative of a video from device A to decoding devices including the device B.

A signal, intended to be transmitted by the device A, carries at least one bitstream comprising coded data representative of a video. The bitstream may be generated from any embodiments of the present principles.

Figure 11:
FIG. 11 shows the syntax of a signal in accordance with an example of the present principles.

FIG. 11 shows an example of the syntax of such a signal transmitted over a packet-based transmission protocol. Each transmitted packet P comprises a header H and a payload PAYLOAD. In some embodiments, the payload PAYLOAD may comprise coded video data encoded according to any one of the embodiments described above. In some embodiments, the signal comprises the interpolation filter coefficients as determined above.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decode re-sampling filter coefficients, re-sampling a decoded picture.

As further examples, in one embodiment "decoding" refers only to entropy decoding, in another embodiment "decoding" refers only to differential decoding, and in another embodiment "decoding" refers to a combination of entropy decoding and differential decoding, and in another embodiment "decoding" refers to the whole reconstructing picture process including entropy decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining re-sampling filter coefficients, re-sampling a decoded picture.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.

b. DASH MPD (Media Presentation Description) Descriptors, for example as used in DASH and transmitted over HTTP, a Descriptor is associated to a Representation or collection of Representations to provide additional characteristic to the content Representation.

C. RTP header extensions, for example as used during RTP streaming.

d. ISO Base Media File Format, for example as used in OMAF and using boxes which are object-oriented building blocks defined by a unique type identifier and length also known as 'atoms' in some specifications.

e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Some embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of re-sampling filter coefficients. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Encoding/decoding a video wherein transform selection for encoding/decoding a block of the video is derived at the decoder based on reconstructed data of the video, according to any of the embodiments described.

Encoding/decoding a video wherein transform selection for encoding/decoding a block of the video is derived at the decoder based on prediction of pixels surrounding the block using a same prediction as the prediction of the block, according to any of the embodiments described.

Encoding/decoding a video wherein transform selection for encoding/decoding a block of the video is not signaled to the decoder, according to any of the embodiments described.

Encoding/decoding a video wherein transform selection for encoding/decoding a block of the video is based on a reordering of the transform mapping table, according to any of the embodiments described.

A bitstream or signal that includes one or more of the described syntax elements, or variations thereof.

A bitstream or signal that includes syntax conveying information generated according to any of the embodiments described.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs decoding of a video according to any of the embodiments described.

A TV, set-top box, cell phone, tablet, or other electronic device that performs decoding of a video according to any of the embodiments described, and that displays (e.g. using a monitor, screen, or other type of display) a resulting video.

A TV, set-top box, cell phone, tablet, or other electronic device that selects (e.g. using a tuner) a channel to receive a signal including an encoded video, and performs decoding of the video according to any of the embodiments described.

A TV, set-top box, cell phone, tablet, or other electronic device that receives (e.g. using an antenna) a signal over the air that includes an encoded video, and performs decoding of the video according to any of the embodiments described.

The invention claimed is:

1. A method comprising:
predicting at least one part of reconstructed pixels surrounding a block of a video using a prediction mode determined for the block,
determining at least one transform for the block among a set of transforms based on the predicting of the at least one part of reconstructed pixels surrounding the block, and
decoding the block by applying the at least one determined transform.

2. An apparatus, comprising one or more processors, wherein said one or more processors are configured to:
predict at least one part of reconstructed pixels surrounding a block of a video using a prediction mode determined for the block,
determine at one least one transform for the block among a set of transforms based on the predicting of the at least one part of reconstructed pixels surrounding the block, and
decode the block by applying the at least one determined transform.

3. A method comprising:
predicting at least one part of reconstructed pixels surrounding a block of a video using a prediction mode determined for the block,
determining at least one transform for the block among a set of transforms based on the predicting of the at least one part of reconstructed pixels surrounding the block, and
encoding the block by applying the at least one determined transform.

4. An apparatus, comprising one or more processors, wherein said one or more processors are configured to:
   predict at least one part of reconstructed pixels surrounding a block of a video using a prediction mode determined for the block,
   determine at one least one transform for the block among a set of transforms based on the predicting of the at least one part of reconstructed pixels surrounding the block, and
   encode the block by applying the at least one determined transform.

5. The method of claim 1, wherein determining the at least one transform comprises using residuals obtained between the at least one part of reconstructed pixels surrounding the block and the corresponding predicted pixels.

6. The method of claim 1, wherein determining the at least one transform comprises:
   obtaining residuals between the at least one part of reconstructed pixels surrounding the block and the corresponding predicted pixels,
   obtaining coefficients by applying each transform of the set of transforms on the residuals, and
   selecting the at least one transform from the set of transforms based on the obtained coefficients.

7. The method of claim 6, wherein selecting the at least one transform from the set of transforms comprises:
   determining a score for each transform of the set of transforms, from at least one coefficient obtained by applying the transform, and
   selecting the at least one transform that maximizes the score.

8. The method of claim 6, wherein selecting the at least one transform from the set of transforms comprises:
   determining a score for each transform of the set of transforms, from at least one coefficient obtained by applying the transform to the residuals,
   ordering in a mapping table the transforms of the set of transforms according to the determined scores, and
   selecting the at least one transform for the block in the ordered mapping table based on a transform index obtained for the block, the transform index identifying a pair of transforms comprising a horizontal transform and a vertical transform.

9. The method of claim 8, wherein the transforms in the mapping table are arranged in pairs of transforms, each pair of transforms comprising a horizontal transform and a vertical transform and selecting the at least one transform includes selecting a pair of transforms.

10. The method of claim 7, wherein the score is determined taking into account a number of coefficients lower than a total number of obtained coefficients.

11. The method of claim 7, wherein the score is a sum of a square of the coefficients or a sum of absolute values of the coefficients.

12. The method of claim 5, wherein at least one part of reconstructed pixels surrounding the block is a line or a column of pixels of a reconstructed block neighboring the block.

13. The method of claim 5, wherein determining the at least one transform comprises determining a horizontal transform and a vertical transform.

14. The method of claim 8, further comprising decoding the transform index.

15. The method of claim 8, wherein only entries starting at a second entry are ordered in the mapping table.

16. The method of claim 8, wherein horizontal transforms and vertical transforms are ordered independently.

17. The method of claim 8, wherein a score is determined for each transform pair and ordering the transforms of the set of transforms comprising ordering the pairs of transforms.

18. The method of claim 5, further comprising decoding a syntax element indicating whether the at least one transform is determined for the block of the video based on the at least one part of reconstructed pixels surrounding the block.

19. The method of claim 18, wherein the syntax element is present only when the prediction mode for the block is determined based on a list of most probable modes, said list of most probable modes being populated with prediction modes derived from the at least one part of the reconstructed pixels surrounding the block.

20. The method of claim 5, wherein the at least one transform for the block is always determined among a set of transforms based on the predicting of the at least one part of reconstructed pixels surrounding the block when the prediction mode for the block is determined based on a list of most probable modes, said list of most probable modes being populated with prediction modes derived from the at least one part of reconstructed pixels.

21. A computer readable storage medium having stored thereon instructions for causing one or more processors to perform the method of claim 1.

22. A computer readable storage medium having stored thereon instructions for causing one or more processors to carry out the method of claim 3.

23. The apparatus of claim 2, further comprising:
   at least one of (i) an antenna configured to receive a signal, the signal including data representative of a video, (ii) a band limiter configured to limit the received signal to a band of frequencies that includes the data representative of video, or (iii) a display configured to display the decoded video.

24. The apparatus according to claim 23, comprising a television, a cell phone, a tablet or a set top box.

25. The apparatus of claim 4, further comprising:
   an accessing unit configured to access data comprising a signal comprising a bitstream including coded data representative of a video, formed by performing the method of claim 1, and
   a transmitter configured to transmit the accessed data.

* * * * *